(12) United States Patent
Song et al.

(10) Patent No.: US 7,742,144 B2
(45) Date of Patent: Jun. 22, 2010

(54) APPARATUS FOR RUBBING ALIGNMENT LAYER

(75) Inventors: Hyun-Ho Song, Gyeonggi-Do (KR); Byoung-Chul Choi, Gyeonggi-Do (KR); Chang-Soo Na, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 344 days.

(21) Appl. No.: 11/477,814

(22) Filed: Jun. 30, 2006

(65) Prior Publication Data

US 2007/0153181 A1 Jul. 5, 2007

(30) Foreign Application Priority Data

Dec. 29, 2005 (KR) ............ 10-2005-0134586

(51) Int. Cl.
*G02F 1/13* (2006.01)
*G02F 1/1337* (2006.01)
*B24B 7/00* (2006.01)

(52) U.S. Cl. .................. 349/187; 349/126; 451/178

(58) Field of Classification Search ............ 349/126, 349/187; 451/178
See application file for complete search history.

(56) References Cited

U.S. PATENT DOCUMENTS

| 5,151,298 | A | * | 9/1992 | Nammatsu et al. ......... 427/77 |
| 5,406,397 | A | * | 4/1995 | Kodera et al. ............ 349/126 |
| 5,671,029 | A | * | 9/1997 | Haruki .................. 349/96 |
| 6,199,563 | B1 | * | 3/2001 | Uehara et al. ........... 134/25.4 |
| 6,520,845 | B2 | * | 2/2003 | Hirokawa et al. ......... 451/287 |
| 7,025,829 | B2 | * | 4/2006 | Lee ..................... 118/106 |
| 7,450,213 | B2 | * | 11/2008 | Kim et al. .............. 349/187 |
| 2003/0108712 | A1 | * | 6/2003 | Tabira et al. ............ 428/96 |

FOREIGN PATENT DOCUMENTS

| JP | 08-152637 | | 6/1996 |
| JP | 10-277916 | A | 10/1998 |
| JP | 2003-215596 | A | 7/2003 |
| JP | 2004302093 | | 10/2004 |
| JP | 2005037740 | | 2/2005 |
| JP | 2005-338172 | A | 12/2005 |
| JP | 2005338172 | A | * 12/2005 |

OTHER PUBLICATIONS

Japanese Utility Model Laid-Open No. H02-001729, "Apparatus for Fabricating a Liquid Crystal Display Device", pp. 81-83 (English Translation attached).

* cited by examiner

*Primary Examiner*—Uyen-Chau N Le
*Assistant Examiner*—John M Bedtelyon
(74) *Attorney, Agent, or Firm*—McKenna Long & Aldridge LLP

(57) ABSTRACT

An apparatus for rubbing an alignment layer by which a defective rubbing due to a load can be prevented by installing a head at an upper portion of a frame, the apparatus including a frame, a rubbing table to which a substrate having an alignment layer is loaded, a rubbing roll disposed at an upper portion of the rubbing table inside the frame, and a head disposed at an upper portion of the frame that supports the rubbing roll.

13 Claims, 4 Drawing Sheets

APPARATUS FOR RUBBING ALIGNMENT LAYER

This application claims the benefit of Korean Application No. 10-2005-134586, filed on Dec. 29, 2005, which is hereby incorporated by reference for all purposes as if fully set forth herein. This application incorporates by reference co-pending application, Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS"; and co-pending application, Ser. No. 11/476,919, filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to an apparatus for rubbing an alignment layer, and particularly, to an apparatus for rubbing an alignment layer of a Liquid Crystal Display (LCD) device that is capable of uniformly rubbing an alignment layer by minimizing an affect due to a force of a rubbing roll that has an increased size and weight.

2. Discussion of Related Art

As various portable electric devices such as mobile phones, personal digital assistants (PDA), notebook computers, etc., continue to be developed, various types of flat panel display devices such as liquid crystal displays (LCDs), plasma display panels (PDPs), field emission displays (FEDs), and vacuum florescent displays (VFDs), having a compact construction, light weight, and low power-consumption also continue to be developed. Due to the ease with which they are driven and to their superior ability to display images, LCDs are extensively used in these electric devices.

The LCD device is a transmissive type display device for displaying images by adjusting an amount of light transmitted through a liquid crystal layer according to an alignment direction of liquid crystal molecules. Hence, an alignment process must be performed for the LCD device to provide each liquid crystal molecule with a uniform direction. In general, many methods are known to produce an alignment layer. An alignment method using a rubbing operation is currently used most frequently. The rubbing alignment method first forms an alignment layer on a substrate and then rubs the alignment layer by use of a rubbing cloth to form uniform microgrooves on a surface of the alignment layer. The alignment layer having the microgrooves on its surface provides each liquid crystal molecule with an alignment controlling force, thereby constantly aligning the liquid crystal molecules over the entire surface of the alignment layer in a desired direction.

However, the alignment method using rubbing may cause the following problems. The rubbing process may include a rubbing cloth that is wound on a rubbing roll and then is placed in contact with the rubbing roll while the rubbing roll is rotated and moved in one direction. Meanwhile, the LCD device is being employed in electric devices such as TV sets as well as portable electric devices recently and accordingly, the size of the LCD device is greatly increasing (furthermore, the mother substrate for fabricating LCD panels is much greater in size) that results in an increase of the width and weight of the rubbing roll used to perform the alignment process for a large LCD device.

In the meantime, the alignment controlling force or a surface fixing force of the alignment layer that is rubbed by the rubbing roll is determined by the microgrooves formed in the alignment layer, and the depth of the microgroove is different based upon a pressure of the rubbing roll applied to the alignment layer. However, as the width and weight of the rubbing roll increases, it is difficult to uniformly maintain the pressure applied to the mother substrate, that results in the fabrication of a defective LCD device by defectively rubbing the alignment layer.

SUMMARY OF THE INVENTION

Accordingly, the present invention is directed to an apparatus for rubbing an alignment layer that substantially obviates one or more of the problems due to limitations and disadvantages of the related art.

An advantage of the present invention is to provide a rubbing apparatus for rubbing an alignment layer with a uniform intensity at any time by preventing a rubbing roll from sagging due to gravity by dispersing a load of a rubbing apparatus.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a rubbing apparatus including a frame, a rubbing table to which a substrate having an alignment layer is loaded, a rubbing roll installed at an upper portion of the rubbing table inside the frame, and a head installed at an upper portion of the frame that supports the rubbing roll.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

A liquid crystal display (LCD) device displays information on a screen using a refractive index anisotropy of a liquid crystal, wherein a signal applied to a liquid crystal layer changes an arrangement direction of the liquid crystals to control a transmissivity of light passing through the liquid crystal layer, thereby displaying images.

Figure 1:
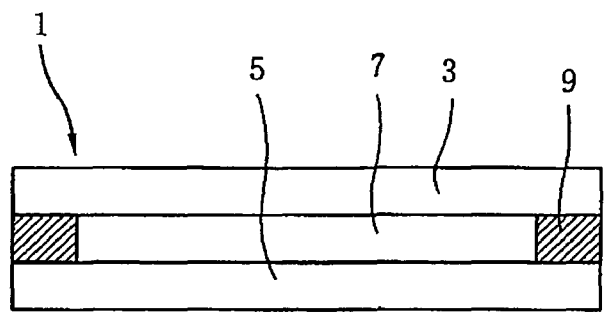
FIG. 1 is a brief sectional view showing a structure of an LCD device according to the present invention.

As shown in FIG. 1, an LCD device 1 includes a lower substrate 5, an upper substrate 3, and a liquid crystal layer 7 disposed between the lower substrate 5 and the upper substrate 3. The lower substrate 5 denotes a driving device array substrate. Although not shown, the lower substrate 5 is provided with a plurality of pixels, each of which is provided with a driving device such as a tin film transistor (TFT). The upper substrate 3 denotes a color filter substrate that includes a color filter layer for implementing colors. In addition, the lower substrate 5 and the upper substrate 3 are respectively provided with a pixel electrode and a common electrode and are coated with an alignment layer for aligning liquid crystal molecules of the liquid crystal layer 7.

The lower and upper substrates 5 and 3 are bonded to each other by a sealant 9. The liquid crystal layer 7 is formed between the lower and upper substrates 5 and 3 bonded to each other to drive liquid crystal molecules by the driving device formed at the lower substrate 5, and accordingly a light amount transmitting the liquid crystal layer 7 is controlled to thusly display information.

Figure 2:
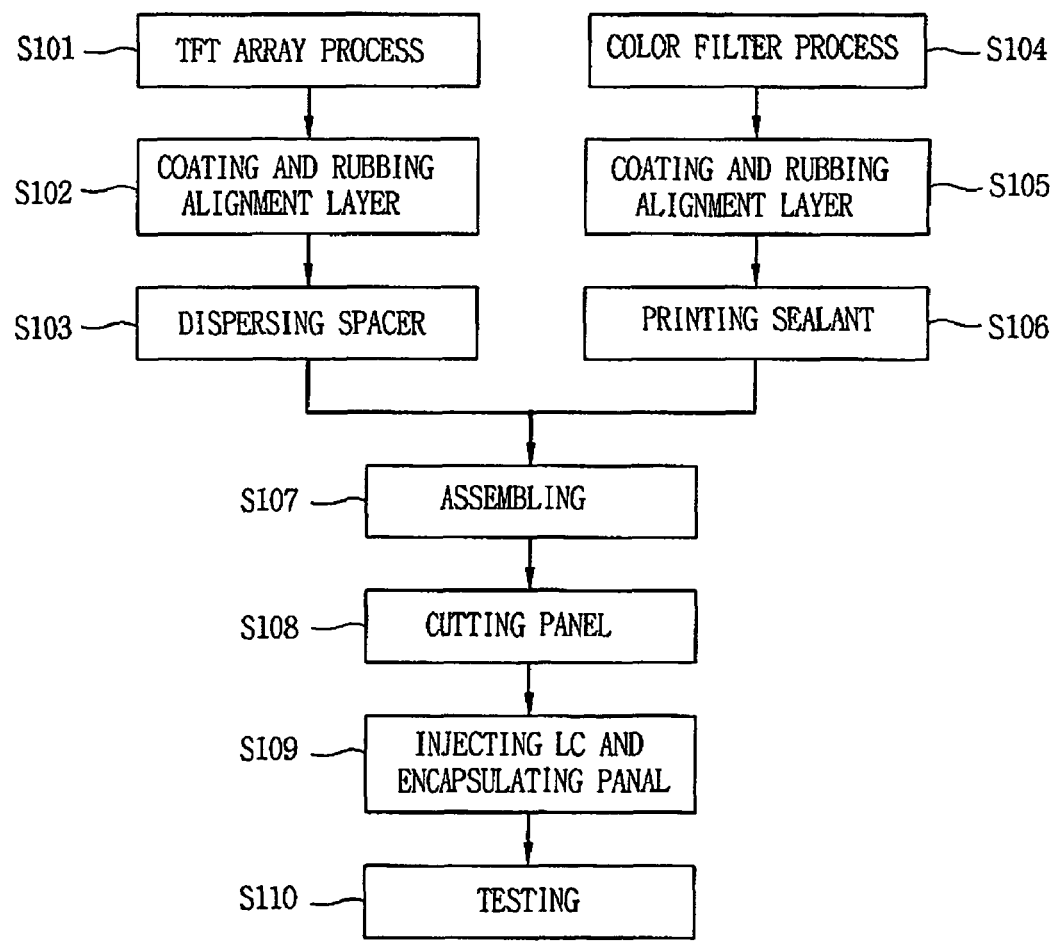
FIG. 2 is a flowchart showing a method for fabricating an LCD device according to the present invention.

A fabrication process of the LCD device is divided into a driving device array substrate forming process for forming the driving device on the lower substrate 5, a color filter forming process for forming the color filter at the upper substrate 3, and a cell process. The fabricating process of the LCD device will now be explained with reference to FIG. 2.

First, a plurality of gate lines and a plurality of data lines are arranged on the lower substrate 5 according to a driving device array forming process to define pixel regions. A TFT, which is a driving device connected to each gate line and each data line, is formed at each pixel region (S101). The driving device array forming process is also performed so as to form a pixel electrode, which is connected to the TFT, to thus drive the liquid crystal layer 7 when a signal is applied via the TFT.

In addition, a color filter layer for implementing R, G and B colors by a color filter process is formed on the upper substrate 3, and a common electrode is also formed thereon (S104).

Afterwards, an alignment layer is respectively coated on the upper and lower substrate 3 and 5. Then, the alignment layer is rubbed in order to provide an alignment controlling force or a surface fixing force (i.e., a pretilt angle and an alignment direction) to the liquid crystal molecules of the liquid crystal layer 7 disposed between the upper and lower substrates 3 and 5 (S102 and S105). Afterwards, a spacer is dispersed over the lower substrate 5 to maintain a constant cell gap and a sealant 9 is printed on an outer periphery of the upper substrate 3, to thereafter bond the lower substrate 5 and the upper substrate by applying a pressure thereto (S103, S106 and S107).

The lower and upper substrates 5 and 3 are formed of a glass substrate having a large size. In other words, a plurality of panel regions are formed on the large glass substrate at once and the TFT (i.e., the driving device) and the color filter layer are formed in each panel region of the large glass substrate. Accordingly, the glass substrate must be cut and processed in order to fabricate unit LCD panels (S108). Afterwards, a liquid crystal is injected into the processed unit LCD panels through a liquid crystal injection opening and then the injection opening is encapsulated to form the liquid crystal layer 7. Then, each unit LCD panel is tested to complete the fabrication of the LCD panel (S109 and S110).

The alignment layer of the LCD panel, which is formed of polyimide or polyamide, may be coated using a spin coating or a screen printing. The coated alignment layer is then dried for a certain time and thereafter its alignment direction is determined by a rubbing process.

Figure 3:
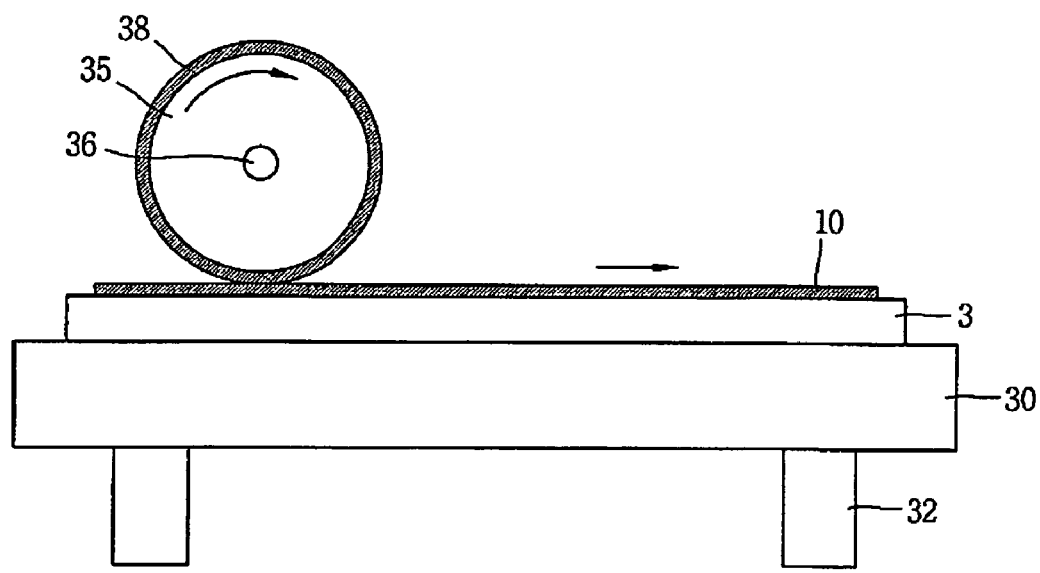
FIG. 3 is a conceptual view showing a rubbing process.

The rubbing process is performed by use of a rubbing roll wound with a rubbing cloth. FIG. 3 is a conceptual view showing the rubbing of the alignment layer.

As shown in FIG. 3, the rubbing can be performed such that a substrate 3 having an alignment layer 10 is put on a rubbing table 30 that is supported by a plurality of legs 32, and then a rubbing roll 35 is rotated in contact with the alignment layer 10 to form microgrooves on the alignment layer 10, thereby providing an alignment controlling force or surface fixing force to the alignment layer 10.

A rubbing cloth 38 is wound on the surface of the rubbing roll 35 to form the microgrooves on the alignment layer 10 by rubbing against the alignment layer 10. At this time, the rubbing roll 35 is rotated around a rotational shaft 36 and moved along the alignment layer 10 in a certain direction.

A rubbing apparatus for performing the rubbing according to the present invention will now be explained with reference to the attached drawings.

Figure 4:
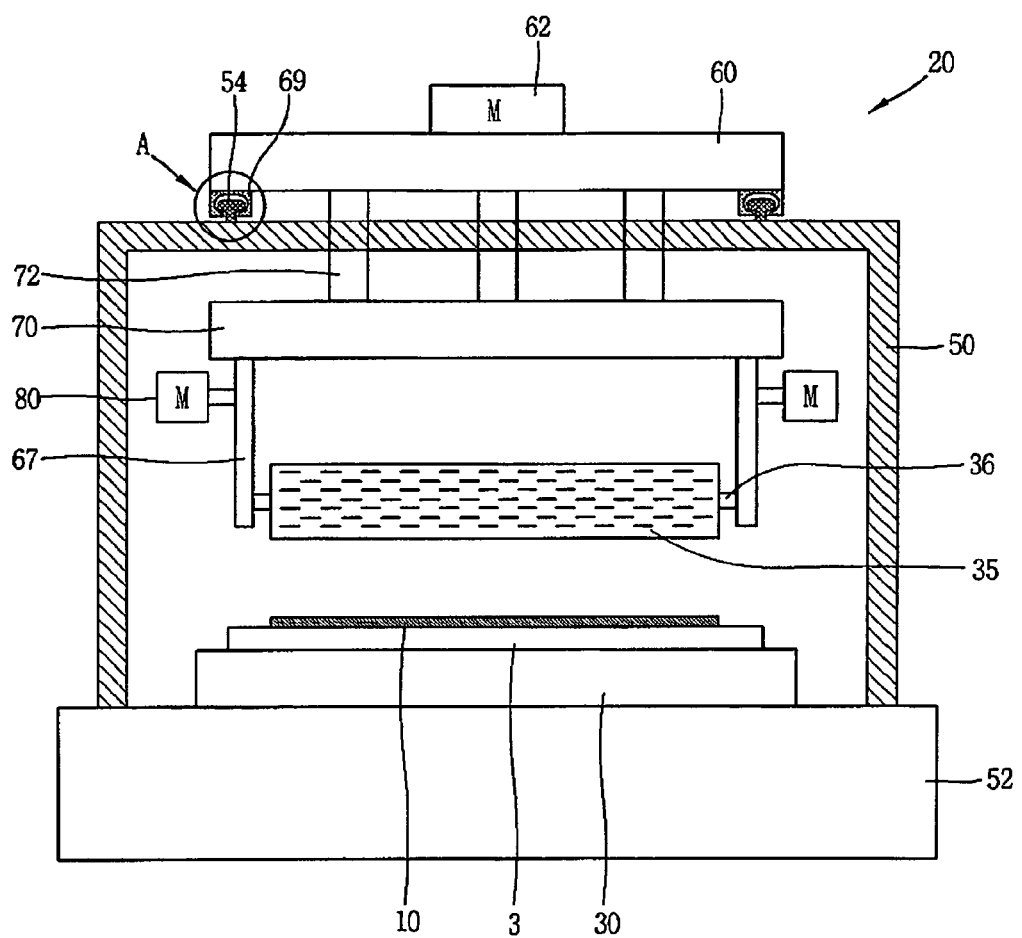
FIG. 4 is a view showing a structure of a rubbing apparatus according to the present invention.

FIG. 4 is a view showing a rubbing apparatus 20 according to the present invention. As shown in FIG. 4, a rubbing apparatus 20 includes a base 52, a frame 50 installed on the base 52, a head 60 disposed at an upper portion of the frame 50 for rotation, a supporting member 70 installed within the frame 50 and connected to the head 60 through shafts 72, an ascending and descending unit 67 connected to the supporting member 70 to raise and lower the rubbing roll 35, an R-guide 54 disposed at an upper portion of the frame 50, a Linear Motion (LM) block 69 having a guide groove into which the R-guide 54 is inserted, and a rubbing table 30 disposed inside the frame 50 on the base 52.

Figure 5A:
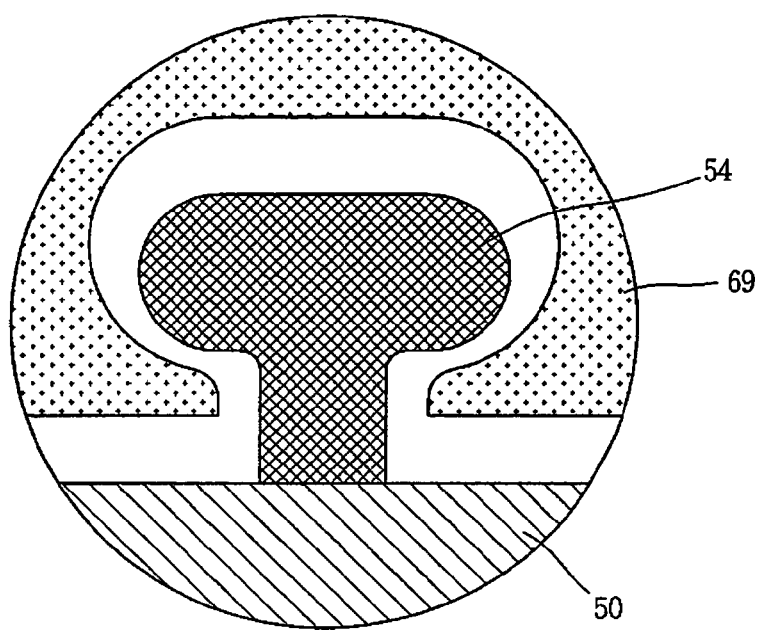
FIG. 5A is an enlarged view of a region A of FIG. 4, which shows an R-guide and an linear motion block of the rubbing apparatus according to the present invention.

A motor 62 is disposed on the head 60. The head 60 is rotated by the motor 62. Here, the R-guide 54 is coupled to the guide groove formed in the LM block 69 to thus guide the head 60 to be rotated. FIG. 5a shows a state where the R-guide 54 is coupled to the LM block 69. Although not shown, a ball or roller is inserted into the LM block 69 to thus prevent a generation of friction when the R-guide 54 is inserted into the LM block 69 and then moved.

Figure 5B:
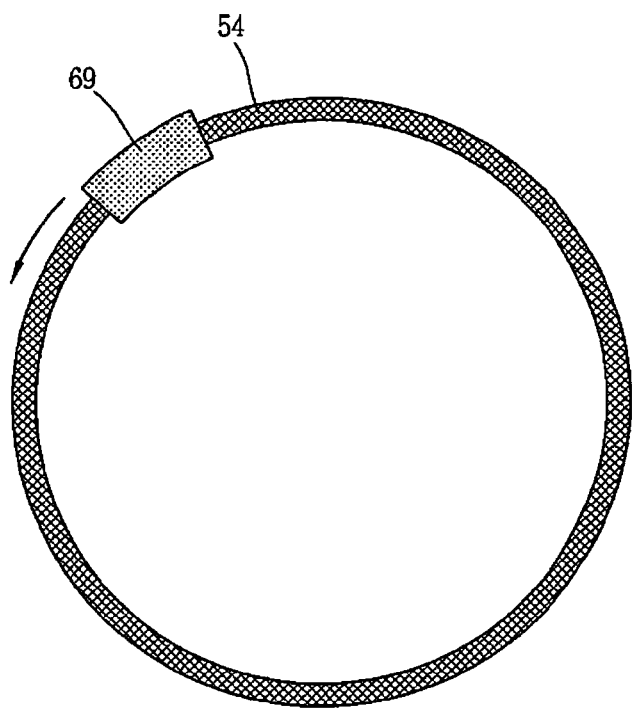
FIG. 5B is a plane view showing the R-guide and the linear motion block in the rubbing apparatus according to the present invention.

FIG. 5b is a plane view showing a state where the R-guide 54 disposed at the upper portion of the frame 50 is coupled to the LM block 69. As shown in FIG. 5b, the R-guide 54 is disposed at the upper portion of the frame 50 in a circular shape. The LM block 69 rotates at the upper portion of the frame 50 along the R-guide 54. The LM block 69 is installed at both ends of the head 60, and accordingly the rotational motion of the LM block 69 corresponds to that of the head 60.

The head 60, on the other hand, is connected to the supporting member 70 via the shafts 72. Here, a space in which the shafts 72 are inserted and moved are formed at the upper portion of the frame 50. Because the head 60 is rotated, the shafts 72 also drive the rotational motion. Accordingly, the space for the rotational motion of the shafts 72 is formed in the upper portion of the frame 50.

The supporting member 70 supports the rubbing roll 35. The supporting member 70 is provided with the ascending and descending units 67 to raise and lower the rubbing roll 35. Although not shown in detail, the ascending and descending unit 67 is provided with a linear motion motor, a linear motor, a rack and pinion, or the like. As the motor 80 is driven, the ascending and descending units 67 raise and lower the rubbing roll 35.

The rotation of the head 60 rotates the supporting member 70 connected to the head 60. Also, the rotation of the supporting member rotates the rubbing roll 35. The rubbing roll 35 is rotated for the following reason. In general, the alignment layers are formed in a direction diagonal to the substrate (but also may be formed in another direction), and the alignment direction depends on mode and/or size of LCD device. Hence, in order to implement different alignment directions, namely, in order to implement different rubbing directions, the rubbing roll 35 may be rotated by a certain angle for its rubbing operation.

The rubbing apparatus according to the present invention having such configuration can be characterized by disposing the head 60 at the upper portion of the frame 50 and can be understood as follows.

Recently, the increases in the area of LCD panels increases the area of the alignment layer formed on the LCD panel that accordingly leads to an increase of the size and weight of the head 60 as well as the size and weight of the rubbing roll 35 which rubs the alignment layer 10. Thus, due to the increase of the weight of the rubbing roll 35 and that of the head 60, the rubbing apparatus 20 is affected by gravity. Here, the affect of gravity is due to the entire weight of the rubbing apparatus 20 including the head 60 as well as the weight of the rubbing roll 35.

The rubbing roll 35 sags due to gravity. When lowering the rubbing roll 35 to contact the alignment layer 10, it is impossible to uniformly maintain the interval between the rubbing roll 35 and the alignment layer 10. Hence, during the rubbing process the distance between the rubbing roll 35 and the alignment layer 10 is not uniform, and the alignment layer 10 is defectively rubbed.

As shown in the present invention, when the head 60 is disposed at the upper portion of the frame 50, the weight of the head 60 is applied to the frame 50, which relatively decreases the weight applied to the rubbing roll 35. Accordingly, the interval between the alignment layer 10 and the rubbing roll 35 may be maintained more uniformly. In addition, as the head 60 is disposed at the upper portion of the rubbing roll 35, the rubbing apparatus may stably be installed to thus minimize the affect of gravity.

Furthermore, the R-guide 54 and the LM block 69 guide the heavy head 60 to be rotated on the frame 50, and accordingly it is possible to adjust the rotation of the head 60 more smoothly and accurately. That is, it is possible to prevent an unstable rotation of the head due to the weight thereof during the rotation of the head 60.

Thus, when the substrate 3 having the alignment layer 10 is loaded on the rubbing table 30 installed on the base 52, the head 60 is rotated by a desired angle along the R-guide based upon the driving mode and/or size of a fabricated LCD device, namely, based upon a direction of the rubbing executed on the alignment layer 10. The head 60 that has been rotated by the desired angle is then fixed by a fixing unit (not shown) formed at the frame 50. In this way, as the head 60 is rotated, the rubbing roll 35 is rotated and then fixed. In this state, the motor 80 of the ascending and descending unit 67 is driven and thereby the ascending and descending unit 67 is operated to raise and lower the roll 35. Because the ascending and descending unit 67 is provided with a linear motion motor, a linear motor or a rack and pinion, the problem in which the rubbing roll 35 at the side of the ascending and descending unit 67 is downwardly moved by gravity due to the heavy weight of the rubbing roll 35 can be prevented.

Therefore, when the rubbing roll 35 is in contact with the alignment layer 10, it is possible to always maintain a constant distance therebetween that results in enabling a rubbing of the alignment layer with a uniform force at any time. Thus, when of the rubbing roll 35 contacts the alignment layer 10, as the shaft 36 of the rubbing roll 35 is rotated by a motor (not shown), the rubbing roll 35 is rotated. Simultaneously, the rubbing table 30 (or the rubbing roll 35) is moved along a desired rubbing direction so as to form microgrooves on the alignment layer 10.

Thus, in the present invention, because the head 60 of the rubbing apparatus 20 is disposed at the upper portion of the frame 50, most loads are applied to the frame 50 and thereby a load which is actually applied to the rubbing roll 35 can be decreased. Hence, it is possible to improve stability of the rubbing apparatus 20 and also to prevent a sagging or downward movement of the rubbing roll 35 due to gravity, thereby enabling the rubbing of the alignment layer 10 with a uniform force at any time.

As described above, in the present invention, the head of the rubbing apparatus is installed at the upper portion of the frame and thus the weight of the rubbing apparatus is partially supported by the frame. Hence, the affect of the weight of the head may be minimized to thus allow the rubbing apparatus to be stably installed. Also, by maintaining a uniform distance between the rubbing roll and the alignment layer, the alignment layer may be rubbed by a uniform force. In addition, in the present invention, the R-guide is used to guide the head to be rotated, that results in an accurate, smooth rotation of the rubbing roll.

On the other hand, in the aforementioned explanation, the specific structure of the rubbing apparatus according to the present invention has been shown, which does not, however, limit the scope of the present invention but is for a convenient explanation. For example, in the aforementioned explanation, the R-guide and the LM block were used to guide the head to be rotated, but the structure is not limited on a use of a guide having the specific structure. Various types of guides can be adapted if they can stably rotate the head. In addition, the ascending and descending unit connected to the supporting member does not have to be limited to the motor having the specific structure. Rather, if it can raise and lower the rubbing roll without deforming the rubbing roll, any structure can be adapted.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus for rubbing an alignment layer comprising:
   a frame having an upper surface;
   a rubbing table to which a substrate having an alignment layer is loaded;
   a rubbing roll disposed at an upper portion of the rubbing table inside the frame, the rubbing roll being rotated centering around a rotational shaft to rub the alignment layer on the substrate;
   a head disposed on the upper surface of the frame, the head being rotating;
   a guiding unit disposed at the regions corresponding to both end sides of the head between the frame and the head to thus guide the head to be rotated;
   a supporting member positioned between the head and the rubbing roll to thus fix the rubbing roll to the head; and a shaft for connecting the supporting member to the head, the shaft including a first shaft at the central portion of the head and at least two second shafts at both sides of the first shaft, the first shaft and the second shafts being perpendicular to the rotational shaft of the rubbing roll, wherein a space is formed in the upper surface of the frame so that the shaft is connected to the head through the space and is moving in the space, wherein the head and the rubbing roll are rotated centering around the first shaft in plane of the rubbing table.

2. The apparatus of claim 1, further comprising a first motor for rotating the shaft.

3. The apparatus of claim 1, wherein the guiding unit includes:

an R-guide disposed on the frame; and a linear motion block disposed at the head and having a guide groove and coupled to the R-guide.

4. The apparatus of claim 3, wherein the R-guide is formed in a circular shape at an upper portion of the frame.

5. The apparatus of claim 1, further comprising a fixing unit for fixing the rotated head.

6. The apparatus of claim 1, further comprising an ascending and descending unit for raising and lowering the rubbing roll.

7. The apparatus of claim 6, further comprising a second motor that drives the ascending and descending unit.

8. An apparatus for rubbing an alignment layer comprising:

a frame having an upper surface;

a rubbing table to which a substrate having an alignment layer is loaded;

a rubbing roll disposed at an upper portion of the rubbing table inside the frame, the rubbing roll being rotated centering around a rotational shaft to rub the alignment layer on the substrate;

a head disposed on the upper surface of the frame that supports the rubbing roll;

a guiding unit disposed at the region corresponding to both end sides of the head between the frame and the head to thus guide the head to be rotated;

a supporting member positioned between the head and the rubbing roll to thus fix the rubbing roll to the head;

a shaft for connecting the supporting member to the head through a space formed in the frame, the shaft including a first shaft at the central portion of the head and at least two second shafts at both sides of the first shaft, the first shaft and the second shafts being perpendicular to the rotational shaft of the rubbing roll; and a first motor for rotating the head centering around the first shaft in plane of the rubbing table, wherein the second shafts are moving in accordance with the rotation of the head.

9. The apparatus of claim 8, wherein the guiding unit includes:

an R-guide disposed on the frame; and a linear motion block disposed at the head and having a guide groove and coupled to the R-guide.

10. The apparatus of claim 9, wherein the R-guide is formed in a circular shape at an upper portion of the frame.

11. The apparatus of claim 8, further comprising a fixing unit for fixing the rotated head.

12. The apparatus of claim 8, further comprising an ascending and descending unit for raising and lowering the rubbing roll.

13. The apparatus of claim 12, further comprising a second motor that drives the ascending and descending unit.

* * * * *